(12) United States Patent
Taylor

(10) Patent No.: US 10,463,198 B2
(45) Date of Patent: Nov. 5, 2019

(54) FINGER PROTECTION SHIELD

(71) Applicant: Donna Plant Taylor, Hilton Head Island, SC (US)

(72) Inventor: Donna Plant Taylor, Hilton Head Island, SC (US)

( * ) Notice: Subject to any disclaimer, the term of this patent is extended or adjusted under 35 U.S.C. 154(b) by 284 days.

(21) Appl. No.: 15/295,447

(22) Filed: Oct. 17, 2016

(65) Prior Publication Data
US 2018/0103697 A1   Apr. 19, 2018

(51) Int. Cl.
| | | |
|---|---|---|
| *A47J 43/18* | (2006.01) | |
| *A41D 13/08* | (2006.01) | |
| *B26B 29/06* | (2006.01) | |
| *A44C 9/00* | (2006.01) | |

(52) U.S. Cl.
CPC ............ *A47J 43/18* (2013.01); *A41D 13/087* (2013.01); *B26B 29/063* (2013.01); *A44C 9/0061* (2013.01)

(58) Field of Classification Search
CPC .. A41D 13/087; B26B 29/063; A44C 9/0061; A47J 43/18
USPC ......... 30/124, 286, 295, 123, 142, 282, 288, 30/289, 291; D7/672–674, 683, 686, 698; 269/289 R, 302.1
See application file for complete search history.

(56) References Cited

U.S. PATENT DOCUMENTS

| | | | | |
|---|---|---|---|---|
| 1,184,710 A | * | 5/1916 | Baumann ............... | B27G 19/02 30/295 |
| 1,554,510 A | | 9/1925 | Kirby | |
| D117,904 S | * | 12/1939 | Körmendy ...................... | D7/669 |
| D149,961 S | * | 6/1948 | Mason ............................ | D7/683 |
| 2,496,062 A | * | 1/1950 | Morfesi ................. | A22C 17/02 30/299 |
| 3,975,043 A | * | 8/1976 | Miles ........................ | B65G 7/12 294/25 |
| D258,634 S | * | 3/1981 | Adams ........................... | D7/683 |
| D267,143 S | * | 12/1982 | Gessing ......................... | D7/411 |
| 4,507,804 A | * | 4/1985 | Consigny ............. | A41D 13/087 2/163 |
| D351,257 S | * | 10/1994 | Roberts ........................ | D29/113 |
| 5,711,027 A | | 1/1998 | Katz et al. | |
| D391,029 S | * | 2/1998 | Katz ............................ | D29/113 |
| D414,300 S | | 9/1999 | Silvey | |
| D418,258 S | * | 12/1999 | Moro ............................ | D29/114 |
| 6,389,944 B1 | * | 5/2002 | Davidson .................. | B26D 3/30 D7/673 |
| 6,729,510 B1 | * | 5/2004 | Romanov ............. | A41D 13/087 2/21 |
| 7,024,979 B1 | * | 4/2006 | Lundin ................... | B26B 29/06 30/124 |
| 7,165,270 B2 | | 1/2007 | DeYoung | |
| D553,804 S | * | 10/2007 | Kaposi ......................... | D29/114 |

(Continued)

*Primary Examiner* — Jason Daniel Prone
(74) *Attorney, Agent, or Firm* — B. Craig Killough; Barnwell Whaley Patterson & Helms

(57) ABSTRACT

A finger protection shield is characterized by a generally vertical shield and a lower member that extends from the generally vertical shield portion. A bottom surface of the lower member comprises a plurality of ridges and grooves that are generally parallel to each other and opposite a finger receiving area that is on an upper surface of the lower member. A ring extends from the generally vertical shield portion that receives a finger of the user's hand. An interior architecture of the device positions the fingers and hand of the user in an optimal manner, while facilitating manipulation of an article to be cut.

20 Claims, 4 Drawing Sheets

(56) References Cited

U.S. PATENT DOCUMENTS

| | | | |
|---|---|---|---|
| 7,296,300 B2 | 11/2007 | Votolato | |
| D558,540 S * | 1/2008 | White | D29/114 |
| D577,155 S * | 9/2008 | Hauser | D29/114 |
| 7,421,787 B2 * | 9/2008 | White | A47J 43/288 30/123 |
| 7,743,690 B2 * | 6/2010 | White | A41D 13/087 30/123 |
| D640,835 S * | 6/2011 | Logan | D29/114 |
| D651,356 S | 12/2011 | Logan et al. | |
| D651,357 S * | 12/2011 | Logan | D29/114 |
| D657,095 S * | 4/2012 | Logan | D29/114 |
| 8,381,313 B2 * | 2/2013 | Logan | A41D 13/087 2/21 |
| D685,617 S * | 7/2013 | Zemel | D7/683 |
| D712,708 S * | 9/2014 | High | D7/683 |
| 8,959,776 B2 * | 2/2015 | Shipp | B26B 29/063 30/286 |
| D812,311 S * | 3/2018 | Taylor | D29/114 |
| 2005/0150029 A1 * | 7/2005 | Votolato | A41D 13/087 2/16 |
| 2012/0144545 A1 | 6/2012 | Lynn | |
| 2014/0090179 A1 | 4/2014 | Stacy | |

\* cited by examiner

FINGER PROTECTION SHIELD

FIELD OF THE INVENTION

The present invention relates generally to kitchen and cooking tools generally, and is more specifically related to a device that protects a user's fingers while assisting in knife skills training.

BACKGROUND OF THE INVENTION

Chefs and cooks often cut their fingers while attempting to slice vegetables or other food items in a uniform pattern. A person naturally holds or guides an article to be cut with his or her non-dominant hand. Fingertips securing the article are positioned near the cutting edge of a knife, while the knife is held and controlled by the dominant hand. As the knife is repeatedly raised and lowered to slice, the exposed fingers are exposed to the cutting zone of the knife edge. Professional chefs are taught to curl fingertips of the guiding/holding hand inward, away from the blade. However, chefs and cooks experience cut fingers. Many chefs have scars on the dorsal side of their fingers from guiding the knife against the natural plane of the top of the curled fingers, resulting in injury to the exposed phalanges.

There is a need for a device that trains a cook or chef on correct hand positioning for cutting, and while providing a shield to prevent knife injuries during a slicing process.

SUMMARY OF THE INVENTION

A finger protection shield is characterized by a generally vertical shield and a lower member that extends from the generally vertical shield portion. A bottom surface of the lower member comprises a plurality of ridges and grooves that are generally parallel to each other and opposite a finger receiving area that is on an upper surface of the lower member. A ring extends from the generally vertical shield portion that receives a finger of the user's hand. An interior architecture of the device positions the fingers and hand of the user in an optimal manner, while facilitating manipulation of an article to be cut.

BRIEF DRAWING DESCRIPTION

DESCRIPTION OF PREFERRED EMBODIMENTS

Figure 4:
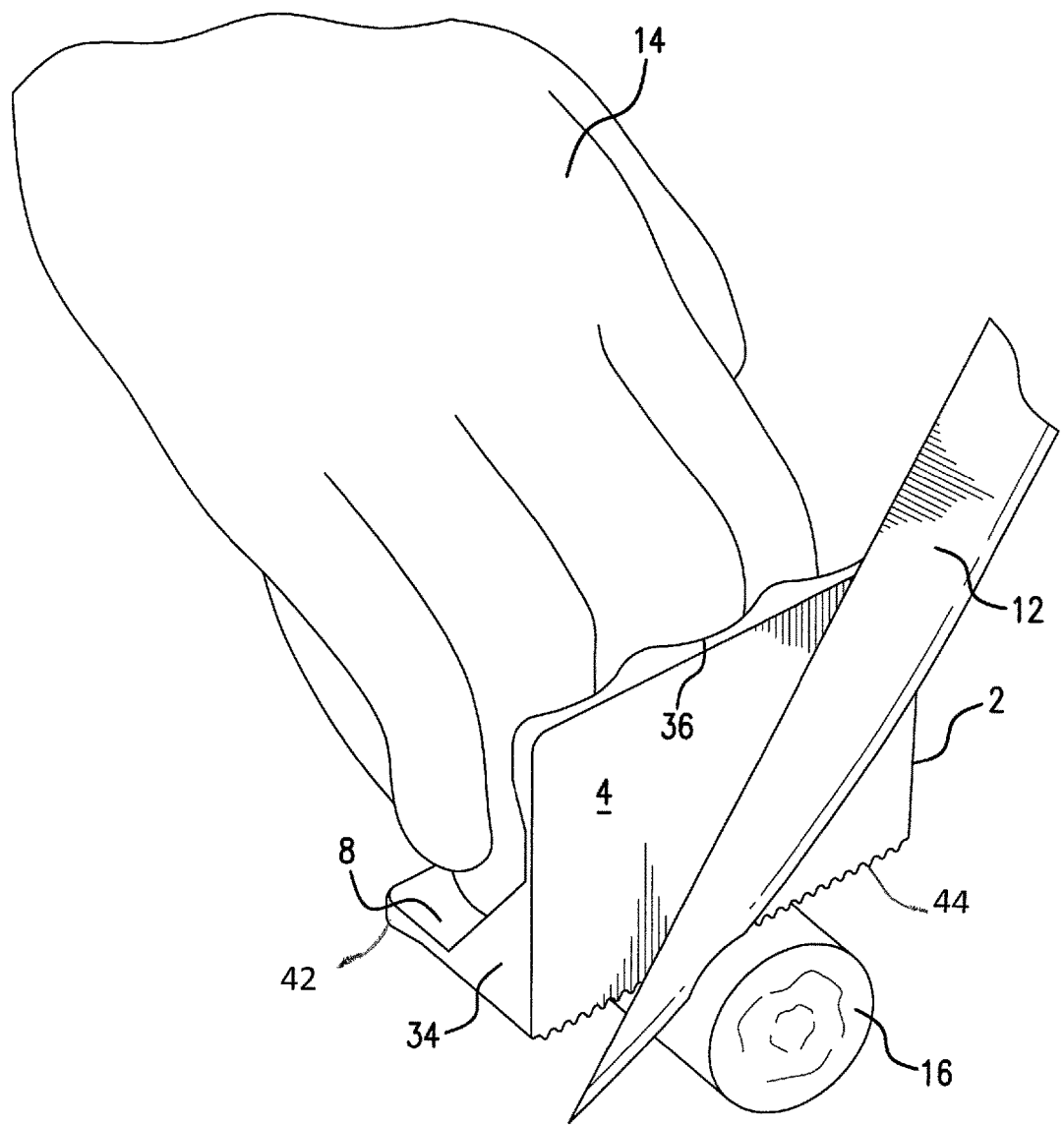
FIG. 4 shows the front of the finger protection shield and demonstrates the device in an exemplary use.

The finger protection shield has a generally vertical member 2 with a front face 4. In a preferred embodiment the front face is a smooth, flat plane. The generally vertical member acts as a barrier between a knife 12 and a user's hand 14, and as a guide for the knife. FIG. 4. The front face may be rectangular in shape.

Figure 3:
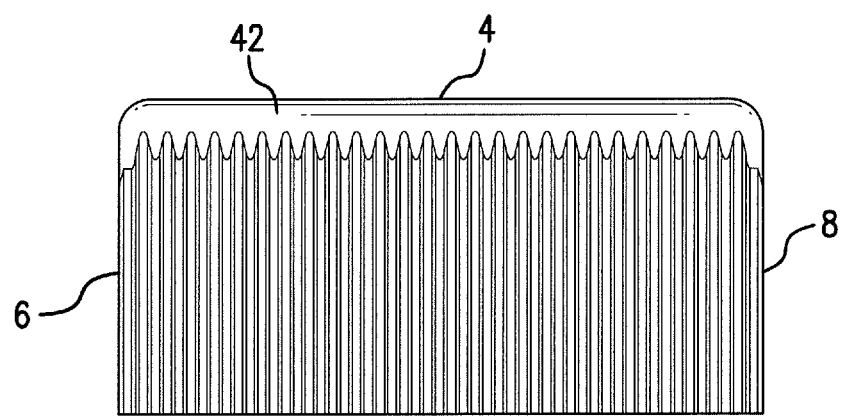
FIG. 3 is a bottom view of the finger protection shield.

The bottom of lower member 8 of the device has a plurality of grooves and ridges 6. FIG. 3. The grooves and ridges are generally parallel to each other. The grooves and ridges run from the front of the device where the front face 4 meets the lower member and toward the rear of the bottom of the lower member. The grooves and ridges are opposite the fingertips of a user when the fingertips are positioned over a top surface of the lower member.

The grooves and ridges 6 are smooth so as to minimize friction against the article 16 that is cut, while inhibiting side to side or lateral movement of the device relative to the article being processed. The parallel grooves and ridges facilitate sliding of the device along the length of the article being cut as the article is cut. The ridges and grooves extend below the generally vertical member and the grooves open at the front face of the generally vertical member. The grooves and ridges create teeth where the bottom of the lower member 8 joins with the front face 4. FIG. 4. The teeth to allow the user to tilt the front face forward and apply downward pressure to "bite" and hold the item while it is sliced. A user can calibrate the amount of grip achieved by the amount of pressure applied to the device to be cut, such as a food item 16 that is positioned under the bottom member and its ridges.

In a preferred embodiment, the grooves and ridges transition to a smooth surface 42 at a rear surface of the device. FIG. 3. The smooth surface reduces friction as the device is pulled over the food item. The smooth surface ascends from the extreme rear of the bottom surface of the lower member 8 and along the bottom surface to the grooves and ridges. FIG. 4. This rise facilitates exiting of the food particles from the grooves for cleaning and clearing the grooves.

Figure 1:
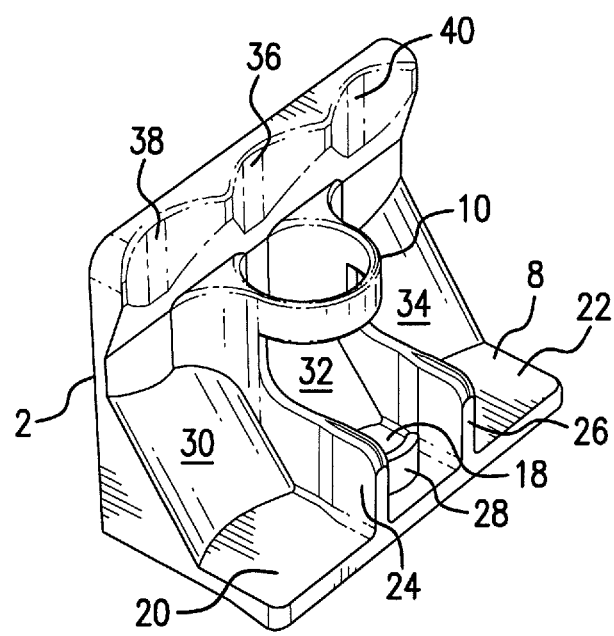
FIG. 1 is a perspective view of a finger protection shield according to an embodiment of the invention, which is shown in an upright position.
Figure 2:
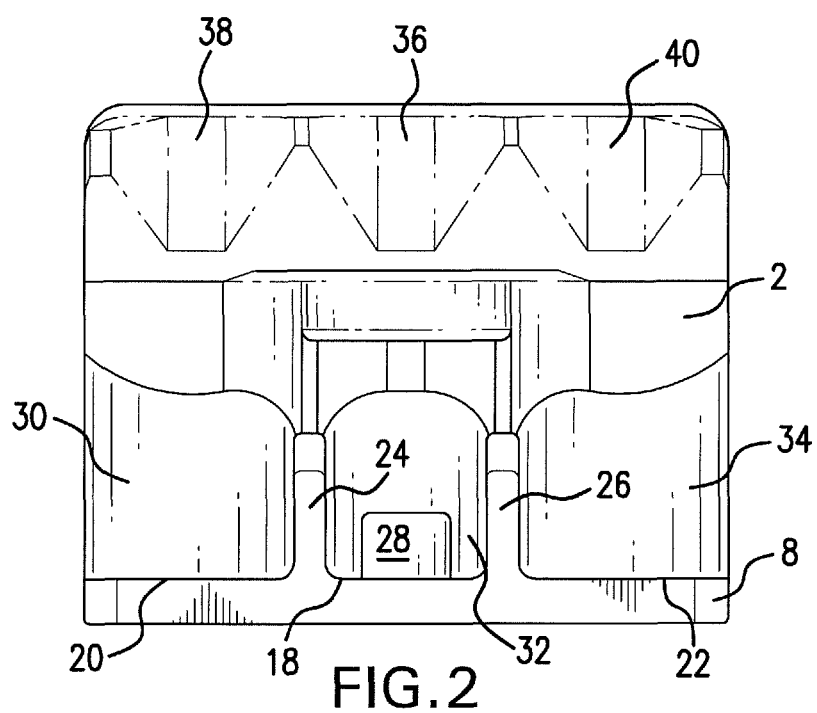
FIG. 2 is a rear elevation of the finger protection shield of FIG. 1.

A finger ring 10 extends from the generally vertical member 2 and opposite the face. FIG. 1. The finger ring is preferably positioned near a center of the generally vertical member 2 and near an upper portion of the generally vertical member. The finger ring may be annular. The finger ring may be used by the user inserting his or her middle finger through the ring for gripping and control, or the user may insert his or her index finger for gliding the device along an article with lesser pressure applied to the device. The user's finger is inserted through the finger ring until the fingertip contacts a center finger receptacle that is formed in the top surface of the lower member.

Finger receiving areas 18, 20, 22 may be formed in the top surface of the lower member. The finger receiving areas may be depressions formed in the top surface of the lower member that are smooth and rounded, and constructed and arranged to receive fingertips of the user therein.

In a preferred embodiment, there are three finger receiving areas 18, 20, 22. The center receiving area 18 is separated from a first outside receiving area 20 and a second outside receiving area 22 of the three finger receiving areas by walls 24, 26 that extend upwardly from the top surface of the lower member. The center receiving area in an embodiment is positioned directly below the opening in the finger ring. Pressure may be applied to the walls by pinching the associated fingers together, giving the user contact with the device in multiple areas of the hand. Detailed application of pressure and fine maneuvering of the device in contact with the food item being sliced is achieved.

A stop 28 may extend upwardly from the top surface of the lower member. The stop is positioned in the center receiving area 18 and opposite the generally vertical member 2. The stop receives pressure from the finger inserted through the finger ring 10 when the device is moved in a backing direction to help control the device. The stop assists with maintaining the fingers in position. Otherwise, the back of the device is open in one embodiment. The open back contributes to control, comfort, ventilation and ease of cleaning.

Wedge shaped finger rests 30, 32, 34 meet the generally vertical member 2 and extend downwardly at an angle from the generally vertical member to meet the lower member 8. In use, the part of the user's finger associated with the distal phalanx is positioned against the finger rests. The finger rests are preferred to have an arcuate shape formed in their outer surfaces from their top to their bottom, and they are constructed and arranged to receive the part of the finger associated with the distal phalanx to maximize contact of that part of the finger with the device. FIG. 1. The finger rests also prompt the user to the correct professional hand position for cutting food items. Repeated use of the device will, by muscle memory, lead to the Clean fingers being positioned in the safe underneath curl position, even when the device is not being worn.

An arcuate indentation 36 in the generally vertical member 2 opposite the front face 4 and above the finger ring 10 provides comfort of finger placement and assists in providing finger pressure against the device from what is the lead finger that is inserted through the finger ring. The arcuate indentation may be concave. This feature creates a balance in the device by allowing the finger in the ring to balance the device. Additional arcuate and concave indentations 38, 40 may be formed in the generally vertical member opposite the front face The structure of the device encourages the user's thumb to be tucked inwardly by pressing against one of the walls 24, 26, depending on whether the user is right handed or left handed. The thumb is protected in a manner which is consistent with chefs' professional training. The front face 4, the ridges 6 on the bottom of the lower member 8 and the interior finger cradle system (discussed more fully below) are easily cleaned and food particles easily removed.

The invention also serves as a glove guard. Commercial food preparation standards require individuals who are handling food items that are not fully cooked prior to service to wear gloves formed of materials such as polyethylene, nitrile or latex during preparation. It is an industry recognized fact that the fingertips of food service gloves often pull away from the ends of the finger tips during food preparation, exposing them to a blade of a knife in use. The food item is contaminated with small bits of the glove, and by direct contact with the chefs skin, which is prohibited by law. The invention serves as a shield and barrier to this common occurrence, which often slows down food production and requires the food item be discarded and results in increased expense.

The grooves and ridges 6 on the bottom of the device function as a "bench scraper" for moving partially cut articles into position for more efficient knife strokes. For example, if the user is preparing minced garlic or finely chopped herbs, he or she normally (without the invention) gathers initially cut pieces with exposed fingers or by using the knife blade. Controlling small partially sliced pieces is difficult and exposes the user's hand to the knife blade or requires the user to attempt further cutting without holding the small pieces in place for further cutting. Using the invention, the user's hands can work together gathering, capturing and chopping the partially cut items quickly and efficiently. The device gathers and holds the pieces steady while the knife blade is brought against the shield for additional cuts.

The ridges and grooves 6 of the bottom of the device serve as a safe knife scraper or cleaner. The dangerous practice of a chef using his or her finger or hand to clear the knife blade 12 of food pieces that stick to the blade after a cut is made is reduced. The food preparer (without the invention) would normally either use their vulnerable index finger or side of their hand to give the knife blade a quick cleaning swipe. With the invention, the user simply uses the bottom of the invention in a similar quick swipe to clear the blade and be ready for the next cut.

The device in one embodiment may be about 1¾ to 2½ inches high at the front face, and about 2 to 3 inches wide at the front face and lower member, with the lower member extending about 1 to 1½ inches from the substantially vertical member. The device may be made of FDA-approved "food safe" materials, such as nylon, ABS plastic, or stainless steel. The top of the lower member may be made of a compressible, but food safe, material such as silicone to increase comfort for the contact of the fingers. The device is preferred to be ambidextrous and may be worn on either the right or left hand. The device may be formed in sizes, small, medium and large, to accommodate the particular user.

In use, the invention is worn on the non-dominant hand by inserting the index or middle finger of the holding hand through the ring 10 from the top. The finger tips come to rest on the receiving areas 18, 20, 22 and distal portions of the fingers rest against wedge shaped finger rests 30, 32, 34. The fingers are separated by the walls 24, 26 that provide holding support and control. These features of the interior architecture of the device form a finger cradle system that properly positions the fingers of the user.

The bottom of the device is positioned in contact with the article to be cut, and is held by pressure applied from the device. FIG. 4. The device protects the user's fingers while the food item is held steady by the gripping ridges and grooves 6. The device presents to the user a perpendicular knife guide positioned over the article to be cut. The knife blade 12 is positioned against the front face 4, which assists in holding the blade perpendicular to the top surface of the article to be sliced. The knife blade is pushed down and forward, while sliding the knife blade down the face of the shield and through the article.

What is claimed is:

1. A finger protection shield, when in an upright position, comprising:
    a generally vertical member having a front face;
    a finger ring that extends from the generally vertical member; and
    a lower member that extends from the generally vertical member at substantially a right angle, wherein a bottom surface of the lower member comprises a plurality of elongated ridges and grooves that are generally parallel to each other configured for facilitating sliding of the finger protection shield on a surface, wherein the grooves open at the front face of the generally vertical member, and wherein a top surface of the lower member comprises at least one finger receiving area that is constructed and arranged to receive a user's fingertips, and wherein the plurality of ridges and grooves extend through the front face and along the bottom surface of the lower member and under the finger receiving area.

2. A finger protection shield as described in claim 1 wherein the at least one finger receiving area comprises three finger receiving areas formed in the top surface of the lower member, and wherein a center finger receiving area of the three finger receiving areas is separated from a first outside receiving area of the three finger receiving areas by a wall that extends upwardly from the lower member.

3. A finger protection shield as described in claim 1 wherein the at least one finger receiving area comprises three finger receiving areas formed in the top surface of the lower member, and wherein a center finger receiving area of the three finger receiving areas is separated from a first outside receiving area of the three finger receiving areas by a wall that extends upwardly from the lower member, and the center finger receiving area of the three finger receiving areas is separated from a second outside receiving area of the three finger receiving areas by a second wall that extends upwardly from the lower member.

4. A finger protection shield as described in claim 1 wherein the at least one finger receiving area comprises three finger receiving areas formed in the top surface of the lower member, and wherein the finger ring that extends from the generally vertical member is positioned above a center finger receiving area of the three finger receiving areas.

5. A finger protection shield as described in claim 1 wherein the at least one finger receiving area comprises three finger receiving areas formed in the top surface of the lower member, wherein a center finger receiving area of the three finger receiving areas is separated from a first outside receiving area of the three finger receiving areas by a wall that extends upwardly from the lower member and the center finger receiving area of the three finger receiving areas is separated from a second outside receiving area of the three finger receiving areas by a second wall that extends upwardly from the lower member, and wherein the finger ring that extends from the generally vertical member is positioned above the center finger receiving area of the three finger receiving areas.

6. A finger protection shield as described in claim 1 wherein the at least one finger receiving area comprises three finger receiving areas formed in the top surface of the lower member, wherein a center finger receiving area of the three finger receiving areas is separated from a first outside receiving area of the three finger receiving areas by a wall that extends upwardly from the lower member, and the center finger receiving area of the three finger receiving areas is separated from a second outside receiving area of the three finger receiving areas by a second wall that extends upwardly from the lower member, and wherein the finger ring that extends from the generally vertical member is positioned above the center finger receiving area of the three finger receiving areas, and further comprising a stop that extends upwardly from the lower member at the center finger receiving area and the stop is spaced apart from the generally vertical member.

7. A finger protection shield as described in claim 1 wherein the ridges and grooves of the bottom surface of the lower member transition to a smooth surface on the bottom surface at a rear of the lower member.

8. A finger protection shield as described in claim 1 wherein the ridges and grooves of the bottom surface of the lower member transition to a smooth surface on the bottom surface at a rear of the lower member, and the smooth surface of the bottom surface ascends from the rear of the lower member to the ridges and grooves.

9. A finger protection shield as described in claim 1 further comprising an arcuate indentation in the generally vertical member opposite the front face and above the finger ring.

10. A finger protection shield as described in claim 1 further comprising a first arcuate indentation in the generally vertical member opposite the front face and above the finger ring, a second arcuate indentation formed in the generally vertical member opposite the front face, and a third arcuate indentation formed in the generally vertical member opposite the front face.

11. A finger protection shield as described in claim 1 further comprising a wedge shaped finger rest joining and extending from the generally vertical member and opposite the front face to join the top surface of the lower member.

12. A finger protection shield as described in claim 11 wherein an outer surface of the wedge shaped finger rest comprises a concave shape.

13. A finger protection shield as described in claim 1 further comprising a first wedge shaped finger rest joining and extending from the generally vertical member and opposite the front face to join the top surface of the lower member, a second wedge shaped finger rest joining and extending from the generally vertical member and opposite the front face to join the top surface of the lower member, and a third wedge shaped finger rest joining and extending from the generally vertical member and opposite the face to join the top surface of the lower member.

14. A finger protection shield as described in claim 13 wherein an outer surface of the first wedge shaped finger rest, the second wedge shaped finger rest and the third wedge shaped finger rest each comprise a concave shape.

15. A finger protection shield, when in an upright position, comprising:
a generally vertical member having a front face;
a finger ring that extends from the generally vertical member;
a lower member that extends from the generally vertical member at substantially a right angle, and
at least one finger rest joining a surface of the generally vertical member that is opposite the front face and extending downwardly across the surface of the generally vertical member that is opposite the front face, the at least one finger rest joining a top surface of the lower member at at least one finger receiving area that is present on the top surface of the lower member.

16. A finger protection shield as described in claim 15 wherein the at least one finger rest comprises a first finger rest joining and extending from the generally vertical member and opposite the front face to join the top surface of the lower member, a second finger rest joining and extending from the generally vertical member and opposite the front face to join the top surface of the lower member, and a third finger rest joining and extending from the generally vertical member and opposite the face to join the top surface of the lower member.

17. A finger protection shield as described in claim 16 wherein the at least one finger receiving area comprises three finger receiving areas formed in the top surface of the lower member where the first finger rest, the second finger rest and the third finger rest join the top surface of the lower member, and wherein a center finger receiving area of the three finger receiving areas is separated from a first outside receiving area of the three finger receiving areas by a wall that extends upwardly from the lower member.

18. A finger protection shield as described in claim 16 wherein an outer surface of the first finger rest, the second finger rest, and the third finger rest each comprise a concave shape.

19. A finger protection shield as described in claim 15 wherein the at least one finger receiving area comprises three finger receiving areas formed in the top surface of the lower member where the finger rest joins the top surface of the lower member, and wherein a center finger receiving area of the three finger receiving areas is separated from a first outside receiving area of the three finger receiving areas by a wall that extends upwardly from the lower member.

20. A finger protection shield as described in claim 15 wherein the at least one finger receiving area comprises three finger receiving areas formed in the top surface of the lower member, wherein a center finger receiving area of the three finger receiving areas is separated from a first outside receiving area of the three finger receiving areas by a wall that extends upwardly from the lower member, and the center finger receiving area of the three finger receiving areas is separated from a second outside receiving area of the three finger receiving areas by a second wall that extends upwardly from the lower member, wherein the finger ring that extends from the generally vertical member is positioned above the center finger receiving area of the three finger receiving areas, and further comprising a stop that extends upwardly from the lower member at the center finger receiving area and the stop is spaced apart from the generally vertical member.

* * * * *